United States Patent
Alvanos et al.

(10) Patent No.: US 12,516,626 B1
(45) Date of Patent: Jan. 6, 2026

(54) FAN BLADE ASSEMBLY WITH LEADING EDGE FILLET

(71) Applicant: RTX Corporation, Farmington, CT (US)

(72) Inventors: Ioannis Alvanos, West Springfield, MA (US); David A. Welch, Quaker Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/203,919

(22) Filed: May 9, 2025

(51) Int. Cl.
| | |
|---|---|
| *F02C 7/055* | (2006.01) |
| *F01D 5/02* | (2006.01) |
| *F02C 7/05* | (2006.01) |
| *F02K 3/06* | (2006.01) |
| *F04D 29/32* | (2006.01) |
| *F04D 29/70* | (2006.01) |
| *B64D 33/02* | (2006.01) |

(52) U.S. Cl.
CPC .............. *F02C 7/055* (2013.01); *F01D 5/02* (2013.01); *F01D 5/021* (2013.01); *F02C 7/05* (2013.01); *F02K 3/06* (2013.01); *F04D 29/325* (2013.01); *F04D 29/329* (2013.01); *F04D 29/701* (2013.01); *F04D 29/703* (2013.01); *B64D 2033/022* (2013.01); *F05D 2220/36* (2013.01); *F05D 2260/606* (2013.01); *F05D 2260/607* (2013.01)

(58) Field of Classification Search
CPC .... F02C 7/05; F02C 7/055; F01D 5/02; F01D 5/21; F02K 3/06; F04D 29/325; F04D 29/329; F04D 29/701; F04D 29/703; B64D 2033/022; F05D 2220/36; F05D 2260/606; F05D 2260/607
See application file for complete search history.

(56) References Cited

U.S. PATENT DOCUMENTS

| | | | | |
|---|---|---|---|---|
| 5,182,906 | A * | 2/1993 | Gilchrist | F02C 7/05 60/226.1 |
| 5,431,535 | A * | 7/1995 | Klujber | F02K 3/06 415/121.2 |
| 7,721,526 | B2 | 5/2010 | Fujimura et al. | |
| 8,105,037 | B2 * | 1/2012 | Grover | F01D 5/143 416/193 A |
| 8,215,910 | B2 | 7/2012 | Belmonte et al. | |
| 9,239,062 | B2 * | 1/2016 | Lamboy | F01D 11/008 |
| 9,297,257 | B2 * | 3/2016 | Kray | F02C 7/04 |
| 9,481,448 | B2 | 11/2016 | Totten et al. | |

FOREIGN PATENT DOCUMENTS

GB 518873 A 3/1940

* cited by examiner

*Primary Examiner* — Kyle Robert Thomas
(74) *Attorney, Agent, or Firm* — Bachman & LaPointe, P.C.

(57) ABSTRACT

A fan blade airfoil and nose cone with leading edge fillet for debris deflection including a fillet formed in the nose cone and inserted into a pocket formed in the fan blade, the filet configured to create a deflection air stream; the deflection air stream being configured to manipulate a fan inlet air flow such that any debris entrained in a fan inlet air flow has a trajectory line directed away from a core flow of a gas turbine engine and toward a bypass flow of the gas turbine engine.

20 Claims, 7 Drawing Sheets

FAN BLADE ASSEMBLY WITH LEADING EDGE FILLET

BACKGROUND

The present disclosure is directed to the improved fan blade airfoil with leading edge fillet.

Aircraft gas turbine engines include a fan assembly having a plurality of circumferentially spaced apart fan blades extending radially outwardly from a rotor disk. Ambient airflow is channeled between the blades and pressurized thereby for generating thrust for powering the aircraft in flight. The fan assembly typically includes a plurality of circumferentially spaced apart fan blades each having a dovetail root disposed in a complementary, axially extending dovetail groove or slot in a perimeter or rim of a rotor disk or drum. A spinner is mounted to a front end of the fan assembly to provide smooth airflow into the fan.

A gas turbine engine's performance is influenced in part by the aerodynamic flow across the surface of the nosecone as well as by the shape of the fan blades that are positioned adjacent to the trailing edge of the nosecone. The surface of the nosecone may be modified so as to improve performance. However, modifying only the surface of the nosecone has limited benefits and are insufficient to reach the level of enhanced aerodynamic performance that is demanded by the industry.

Current fan blade airfoils do not incorporate large leading edge fillets. Current fan blade airfoils do not have the real estate required to accommodate a large leading edge fillet. Incorporation of a large leading edge fillet can require the fan root to be drastically redesigned, adding hardware weight, and axial length.

SUMMARY

In accordance with the present disclosure, there is provided a fan blade airfoil and nose cone with leading edge fillet for debris deflection comprising: a fillet formed in the nose cone and inserted into a pocket formed in the fan blade, the filet configured to create a deflection air stream; the deflection air stream being configured to manipulate a fan inlet air flow such that any debris entrained in a fan inlet air flow has a trajectory line directed away from a core flow of a gas turbine engine and toward a bypass flow of the gas turbine engine.

A further embodiment of any of the foregoing embodiments may additionally and/or alternatively include the fillet is configured to create the deflection air stream which is configured to manipulate a boundary layer flow proximate the nose cone radially from a centerline axis of the nose cone.

A further embodiment of any of the foregoing embodiments may additionally and/or alternatively include the fillet is located upstream of the fan blade and arrayed circumferentially around the nose cone relative a centerline axis of the nose cone.

A further embodiment of any of the foregoing embodiments may additionally and/or alternatively include the fillet comprises a fillet curvature extending along a fillet length, the fillet curvature matching a curvature of the fan blade airfoil.

A further embodiment of any of the foregoing embodiments may additionally and/or alternatively include the fillet includes a fillet leading edge, the fillet leading edge includes a fillet canted surface; the fillet canted surface being slanted such that a height of the fillet leading edge proximate a suction side exceeds a height of the fillet leading edge proximate a pressure side along a length of the fillet leading edge.

A further embodiment of any of the foregoing embodiments may additionally and/or alternatively include a fillet height proximate a fillet leading tip is less than a fillet height proximate a fillet trailing tip.

A further embodiment of any of the foregoing embodiments may additionally and/or alternatively include the pocket is proximate a blade platform and proximate a leading edge of the fan blade; the pocket extends along the leading edge radially away from a blade root portion; wherein the pocket is configured to receive the fillet.

In accordance with the present disclosure, there is provided a gas turbine engine having fan blade and nose cone with leading edge fillet for debris deflection comprising: a fan section including a fan blade upstream from a bypass duct and a core separated by a splitter; a fillet formed in the nose cone and inserted into a pocket formed in the fan blade; the filet comprising a fillet body including a base portion adjacent a fillet leading edge and a fillet trailing edge opposite the fillet leading edge; the fillet body including a fillet leading tip proximate an intersection of the fillet leading edge and the fillet base portion; the fillet body including a fillet trailing tip proximate an intersection of the fillet leading edge and the fillet trailing edge; the pocket being proximate a blade platform and proximate a leading edge of the fan blade; the pocket extends along the leading edge radially away from a blade root portion; wherein the pocket is configured to receive the fillet.

A further embodiment of any of the foregoing embodiments may additionally and/or alternatively include the fillet comprises a fillet curvature extending along a fillet length, the fillet curvature matching a curvature along an airfoil of the fan blade.

A further embodiment of any of the foregoing embodiments may additionally and/or alternatively include the fillet is shaped to accelerate a deflection air stream to prevent formation of flow vortices in the deflection air stream and a fan inlet airflow.

A further embodiment of any of the foregoing embodiments may additionally and/or alternatively include the fillet leading edge includes a fillet canted surface; the fillet canted surface being slanted such that a height of the fillet leading edge proximate a suction side exceeds a height of the fillet leading edge proximate a pressure side along a length of the fillet leading edge.

A further embodiment of any of the foregoing embodiments may additionally and/or alternatively include the fillet body comprises a fillet thickness dimension extending between a fillet suction side and a fillet pressure side; the fillet thickness dimension varying from the fillet leading tip to the fillet trailing tip.

A further embodiment of any of the foregoing embodiments may additionally and/or alternatively include the fillet body is shaped as a turning vane and configured to prevent the formation of flow vortices in a deflection air stream and a fan inlet airflow.

In accordance with the present disclosure, there is provided a process for forming fan blade and nose cone with leading edge fillet for debris deflection comprising: forming a fan section including a fan blade upstream from a bypass duct and a core separated by a splitter; forming a fillet in the nose cone and inserting the fillet into a pocket formed in the fan blade; the filet comprising a fillet body including a base portion adjacent a fillet leading edge and a fillet trailing edge opposite the fillet leading edge; the fillet body including a fillet leading tip proximate an intersection of the fillet leading edge and the fillet base portion; the fillet body including a fillet trailing tip proximate an intersection of the fillet leading edge and the fillet trailing edge; forming the pocket proximate a blade platform and proximate a leading edge of the fan blade; extending the pocket along the leading edge radially away from a blade root portion; and configuring the pocket to receive the fillet.

A further embodiment of any of the foregoing embodiments may additionally and/or alternatively include the process further comprising forming a fillet curvature extending along a fillet length, the fillet curvature matching a curvature along an airfoil of the fan blade.

A further embodiment of any of the foregoing embodiments may additionally and/or alternatively include the process further comprising shaping the fillet to accelerate a deflection air stream to prevent formation of flow vortices in the deflection air stream and a fan inlet airflow.

A further embodiment of any of the foregoing embodiments may additionally and/or alternatively include the process further comprising forming the fillet leading edge including a fillet canted surface; the fillet canted surface being slanted such that a height of the fillet leading edge proximate a suction side exceeds a height of the fillet leading edge proximate a pressure side along a length of the fillet leading edge.

A further embodiment of any of the foregoing embodiments may additionally and/or alternatively include the process further comprising forming the fillet body comprising a fillet thickness dimension extending between a fillet suction side and a fillet pressure side; and varying the fillet thickness dimension from the fillet leading tip to the fillet trailing tip.

A further embodiment of any of the foregoing embodiments may additionally and/or alternatively include the process further comprising configuring the fillet to create a deflection air stream to manipulate a boundary layer flow proximate the nose cone radially from the centerline axis of the nose cone.

A further embodiment of any of the foregoing embodiments may additionally and/or alternatively include the process further comprising configuring the fillet to create a deflection air stream; configuring the deflection air stream to manipulate a fan inlet air flow such that any debris entrained in the fan inlet air flow has a trajectory line directed away from a core flow of a gas turbine engine and toward a bypass flow of the gas turbine engine.

Other details of the fan blade airfoil with large leading edge fillet are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the disclosure.

DETAILED DESCRIPTION

Figure 1:
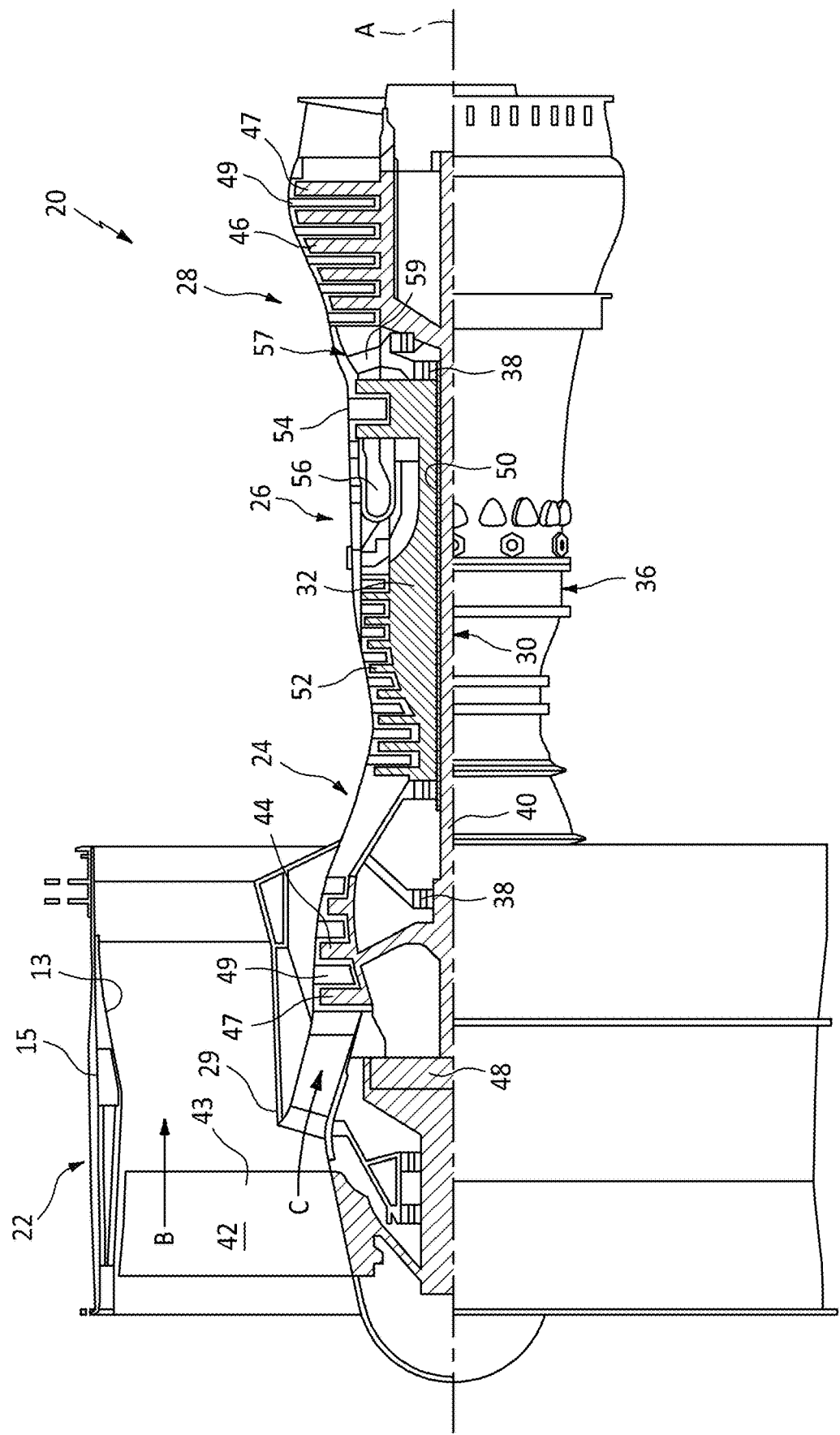
FIG. 1 is a cross section schematic view of an example turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent to the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(Tram\ °R)/(518.7\ °R)]^{0.5}$. The "low corrected fan tip speed" can be less than or equal to 1150.0 ft/second (350.5 meters/second), and greater than or equal to 1000.0 ft/second (304.8 meters/second).

Figure 2:
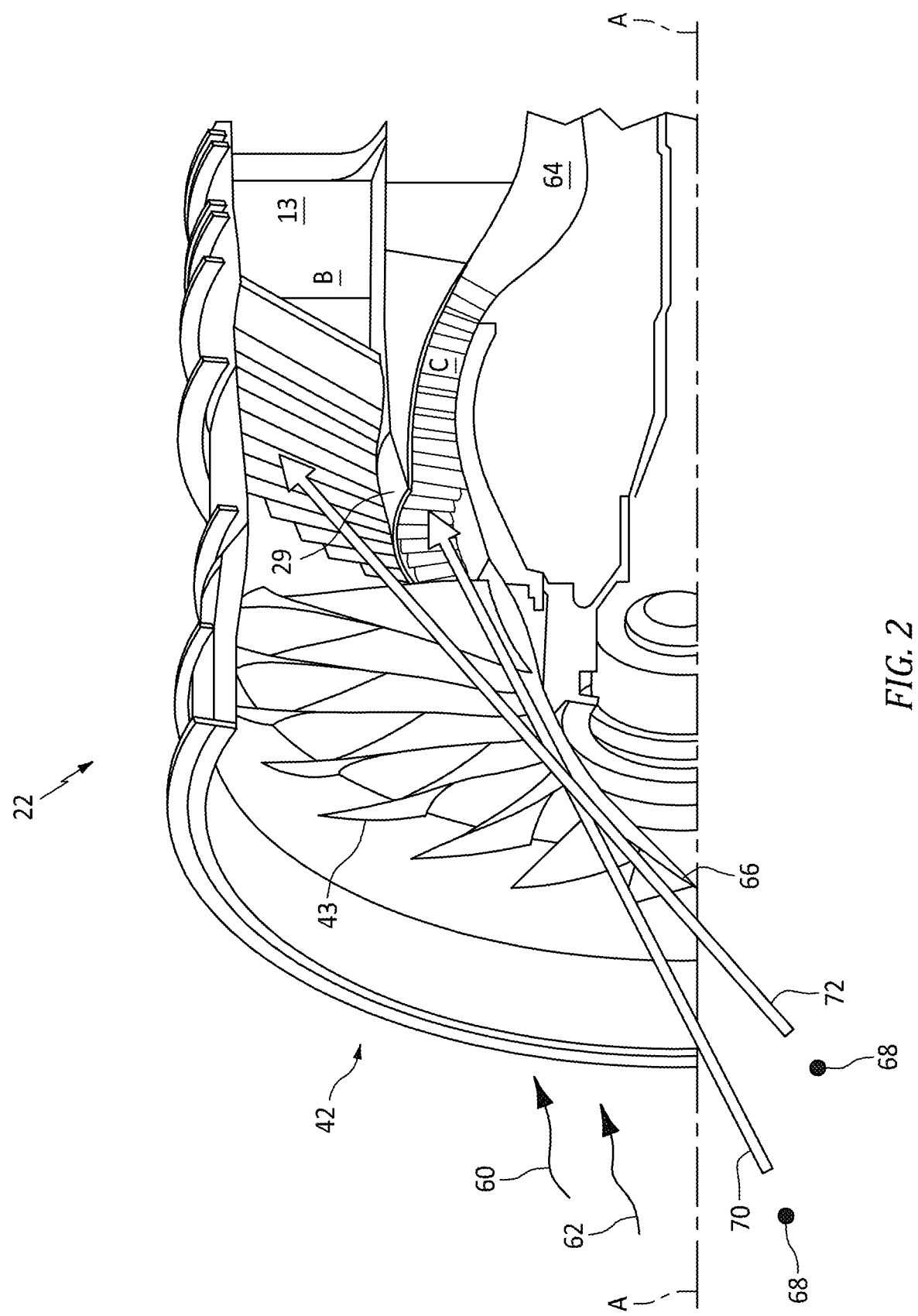
FIG. 2 is a cross section schematic representation of an exemplary fan section and downstream airflow paths.
Figure 3:
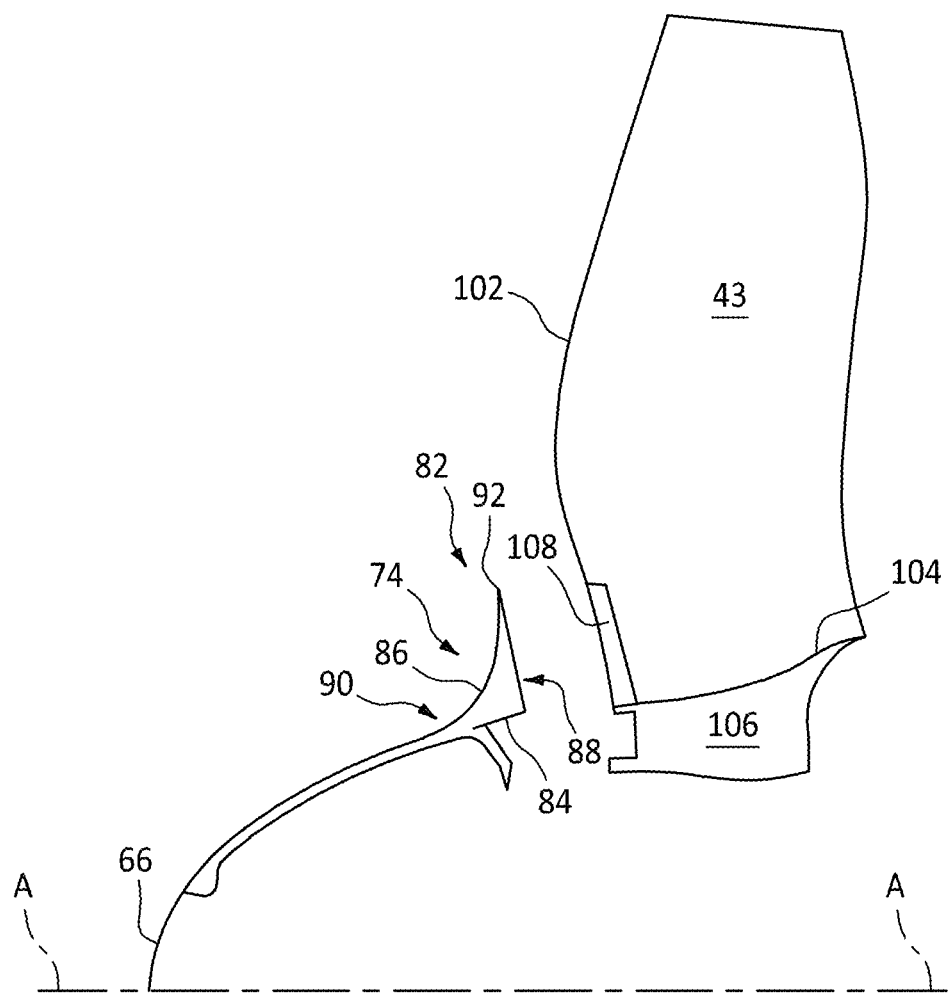
FIG. 3 is a cross section schematic representation of an exemplary fan blade and unassembled exemplary nose cone.
Figure 4:
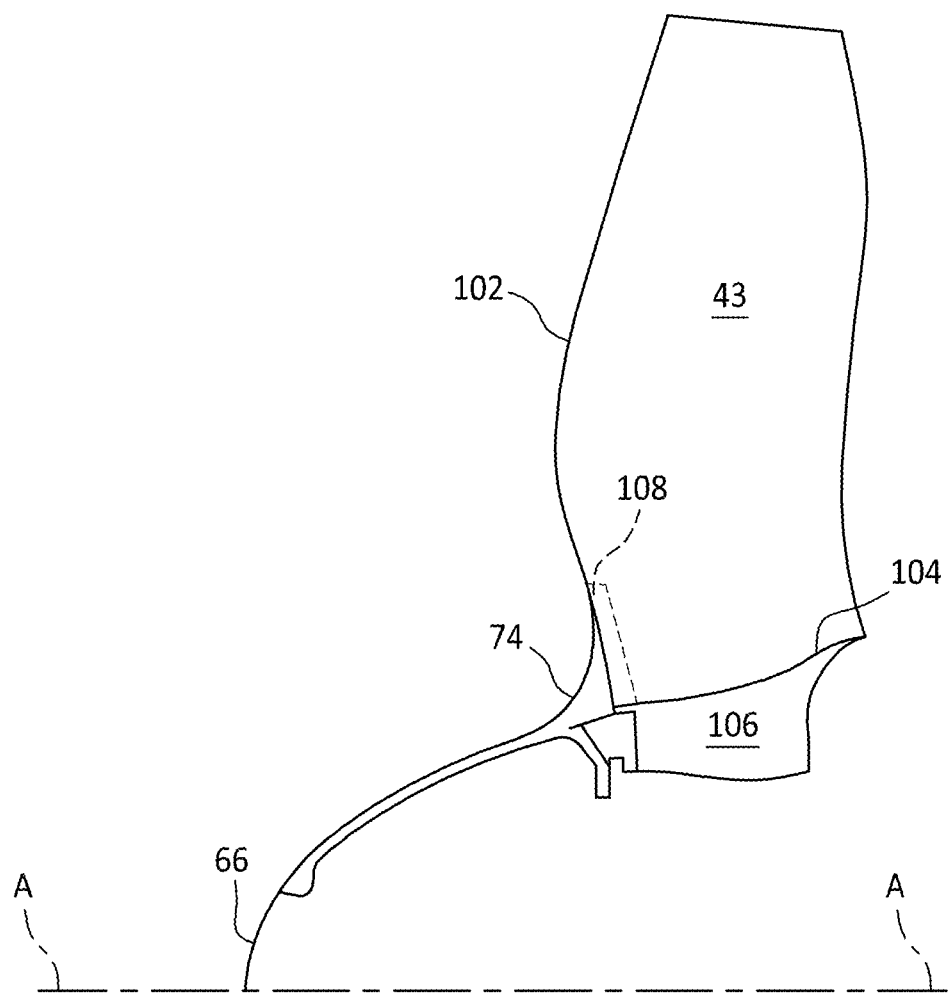
FIG. 4 is a cross section schematic representation of an exemplary fan blade and assembled exemplary nose cone.
Figure 5:
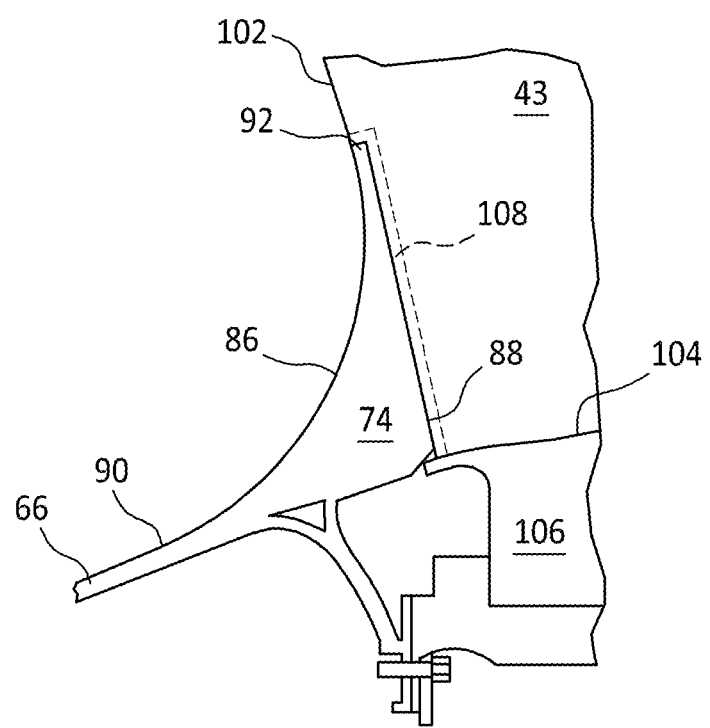
FIG. 5 is a close-up view cross section schematic representation of an exemplary fan blade and assembled exemplary nose cone of FIG. 4.
Figure 6:
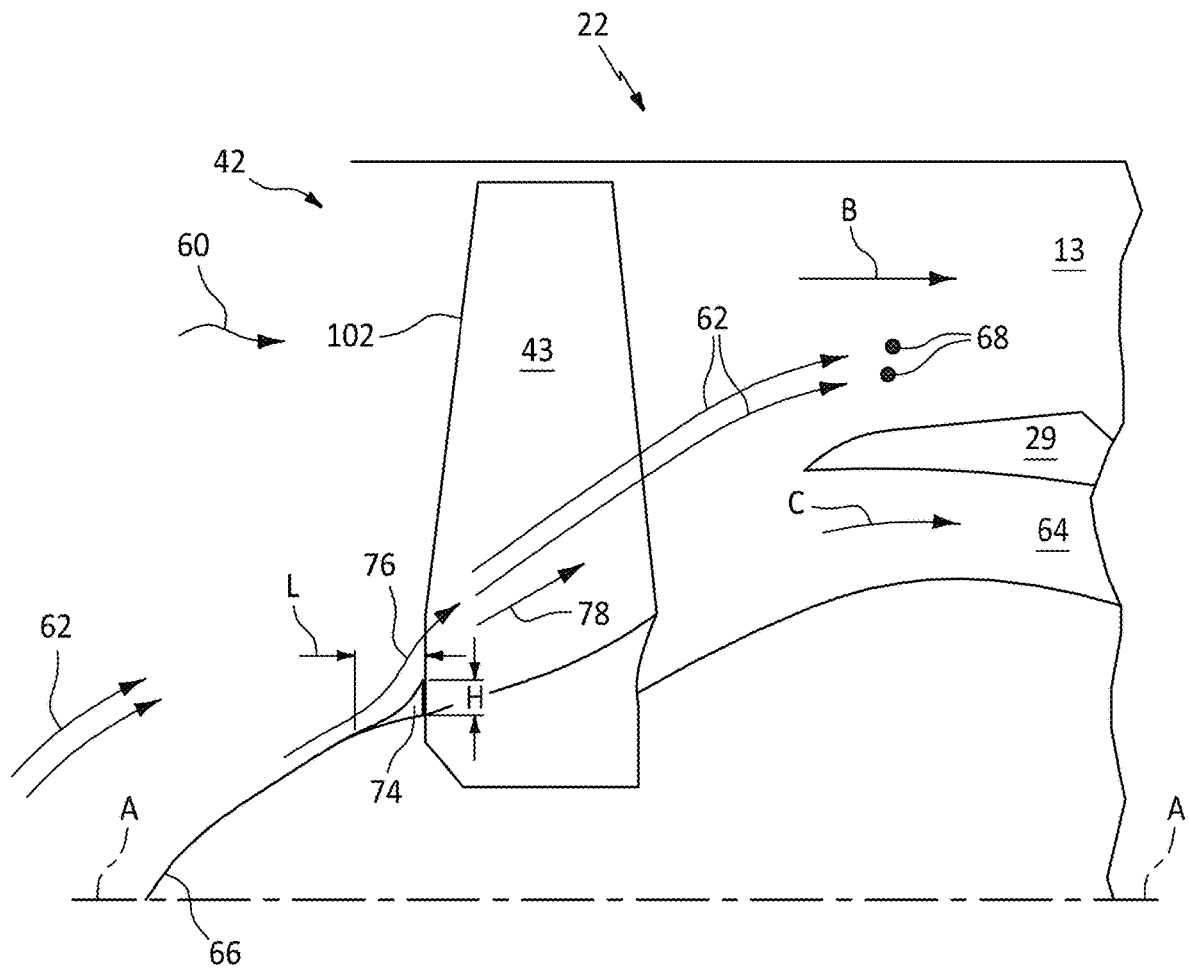
FIG. 6 is a cross section schematic representation of an exemplary fan section with fan blade and assembled exemplary nose cone.

Referring also to FIG. 2 showing an exemplary fan section 22. The fan section 22 includes the fan 42 having fan blades 43 configured to create fan airflow 60. The fan airflow 60 can be shown as fan inlet airflow 62 and downstream from the blades 43 the bypass flow B and the core flow C separated by the splitter 29. The bypass flow B flows into the bypass duct 13. The core flow C flows into the core 64. The fan inlet airflow 62 can flow past a nose cone 66. The fan inlet airflow 62 can carry debris 68. The debris 68 can include particles of sand and dust, silt, stone chips, soil and the like entrained in the fan inlet airflow 62. The debris 68 is shown with at least two trajectory lines 70 and 72. The trajectory line 70 shows the debris 68 traveling into the core flow C. The trajectory line 70 into the core flow C is unwanted and to be avoided. The trajectory line 72 shows the debris 68 traveling into the bypass flow B. The trajectory line 72 into the bypass flow B is acceptable. The trajectory line 72 can carry the debris 68 away from the core 64 and into the bypass duct 13.

Referring also to FIG. 3, FIG. 4, FIG. 5, FIG. 6 and FIG. 7 showing exemplary nose cones 66 paired with an exemplary fan blade 43. The nose cones 66 can include a fillet 74. The fillet 74 is configured to create a deflection air stream 76. The deflection air stream 76 can manipulate the inlet air 62 such that any debris 68 entrained in the inlet air 62 has the trajectory line directed away from the core flow C and instead toward the bypass flow B. The fillet 74 creates the deflection air stream 76 that is configured to manipulate a boundary layer flow 78 radially from the centerline axis A.

The fillet 74 can be located upstream of each fan blade 43 and arrayed circumferentially around the nose cone 66 relative to the axis A. The fillet 74 can be attached directly to the nose cone 66. The fillet 74 can be made from many individual portions arrayed about the nose cone 66. The fillet 74 can be made integral with a trailing edge 80 of the nose cone 66.

The fillet 74 can include a fillet body 82. The fillet body 82 can have a base portion 84. The fillet body 82 can include a fillet leading edge 86 and a fillet trailing edge 88 opposite the fillet leading edge 86. The fillet body 82 includes a fillet leading tip 90 proximate the intersection of the fillet leading edge 86 and the fillet base portion 84. The fillet body 82 includes a fillet trailing tip 92 proximate the intersection of the fillet leading edge 86 and the fillet trailing edge 88.

A fillet length L dimension can extend between the fillet leading tip 90 and the fillet trailing edge 88 along the base portion 84. The fillet body 82 can have a fillet height H dimension that can extend radially from the fillet base portion 84 to the fillet trailing tip 92. The fillet height H can be varied along the fillet length L, such that the fillet height H increases from the fillet leading tip 90 to the fillet trailing edge 88. The fillet body 82 can have a fillet thickness T dimension extending between a fillet suction side 94 and a fillet pressure side 96. The fillet thickness T dimension can vary from the fillet leading tip 90 to the fillet trailing tip 92.

Figure 7:
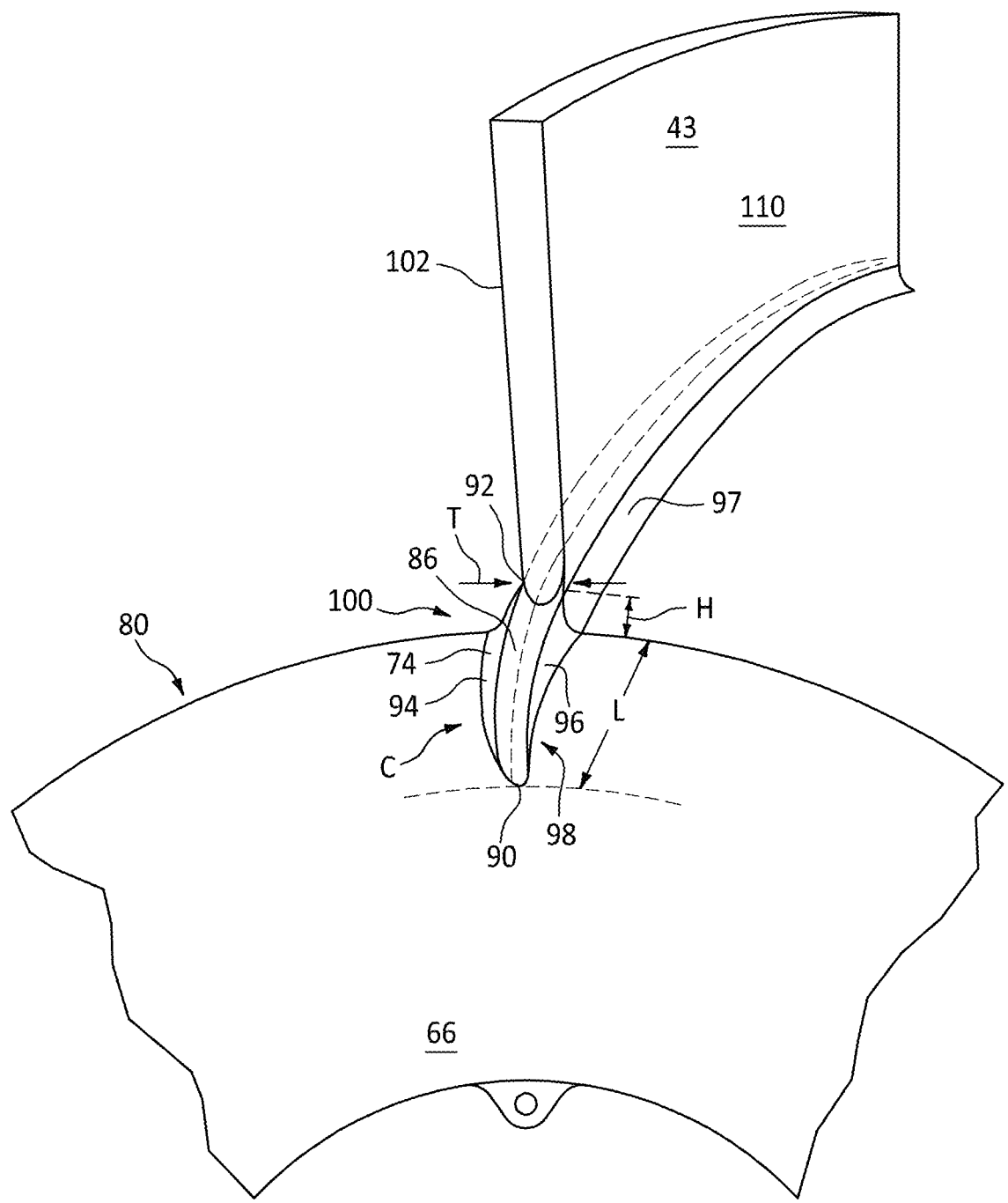
FIG. 7 is an isometric schematic representation of an exemplary fan section with fan blade and assembled exemplary nose cone.

As seen in FIG. 7, the fillet body 82 can include a fillet curvature C extending along the fillet length L. The fillet curvature C can match the curvature of the fan blade 43 along the airfoil 110 of the fan blade 43. The fillet curvature C can be shaped to react to the direction of rotation of the nose cone 66. The fillet pressure side 96 and the fillet suction side 94 can match a shape of a blade root fillet 97. The blade root fillet 97 can be shaped such that the blade root fillet 97 continues into the fillet body 82 and decreases in size as the blade root fillet 97 extends forward to nose cone 66. The blade root fillet 97 can have a compound curvature.

The fillet leading edge 86 can include a fillet canted surface 98. The fillet canted surface 98 can be slanted, tilted, oblique such that the fillet leading edge 86 height H proximate the suction side 94 can be larger than the fillet leading edge 86 height H proximate the pressure side 96 along the length of the fillet leading edge 86. The fillet height H proximate the fillet leading tip 90 can be smaller than the fillet height H proximate the fillet trailing tip 92. The fillet 74 can enable the boundary layer flow 78 to attach sooner to the geometric profile of the fan blade 43 and can reduce drag and improve fan performance.

The fillet body 82 can shaped as a nozzle/turning vane 100. The fillet body 82 can be shaped to accelerate the deflection air stream 76. The fillet body 82 can be shaped to prevent the formation of flow vortices in the deflection air stream 76 and the fan inlet airflow 62. The fillet body 82 can be configured to maintain laminar flow boundary in the boundary layer flow 78. In an exemplary embodiment, the fillet canted surface 98 can be tapered with a ratio of from 12:1. In an exemplary embodiment, the fillet canted surface 98 can be tapered with a ratio of from 15:1. The taper ratio can be related to the blade thickness and the core height. The fillet body 82 can be shaped to direct the deflection air stream 76 tangential to the fan inlet airflow 62 entering the fan section 22. The fillet 74 can be configured to direct the deflection air stream 76 in a direction opposite a direction of the fan 42 rotation.

The fan blade 43 can include a blade leading edge 102. The fan blade 43 can include a platform 104 proximate a root portion 106. The fan blade 43 can include a pocket 108. The pocket 108 can be proximate the platform 104 and proximate the leading edge 102. The pocket 108 can extend along the leading edge 102 radially away from the root portion 106. The pocket 108 can be configured to receive the fillet 74. Particularly, the pocket 108 can be configured to receive insertion of the fillet trailing edge 88. The pocket 108 can be sized to match the dimensions of the fillet body 82 proximate the fillet trailing edge 88 from the fillet base portion 84 to the fillet trailing tip 92. The fillet 74 can be inserted into the pocket 108 of the fan blade 43 such that the fillet trailing edge 88 extends into the pocket 108 past the blade leading edge 102. The fillet trailing edge 88 wrap around the blade leading edge 102 to create a smooth transition between the fillet trailing edge 88 and the blade leading edge 102.

The fillet 74 can be configured to redirect the debris 68 away from the core 64. The debris 68 can include materials ranging in nominal size from about 0.002 millimeters to about 2 millimeters.

A technical advantage of the disclosed fan blade airfoil with large leading edge fillet includes a nose cone with a fillet geometry/curve which enhances the nose cone to blade interface.

Another technical advantage of the disclosed fan blade airfoil with large leading edge fillet includes the fillet acting as a turning vane which will drive the fan inlet air flow to flow as a deflection air stream.

Another technical advantage of the disclosed fan blade airfoil with large leading edge fillet includes the fillet on the nosecone, but forward of the fan blades to drive the flow in a tangential or other suitable direction to deflect the debris.

Another technical advantage of the disclosed fan blade airfoil with large leading edge fillet includes the exiting deflection air stream flow can deflect debris thru the bypass duct rather than the core to reduce hardware damage by debris.

Another technical advantage of the disclosed fan blade airfoil with large leading edge fillet includes an increase to the reaction area for debris to be deflected in the bypass duct to minimize hardware damage in the core.

Another technical advantage of the disclosed fan blade airfoil with large leading edge fillet includes an Aero performance benefit relative to the direction of the exit flow in the tangential direction (or other suitable extract) entering the fan inlet blades. The directional flow of the deflection air stream flow could minimize vortices increasing the performance.

There has been provided a fan blade airfoil and nose cone with leading edge fillet. While the fan blade airfoil and nose cone with large leading edge fillet has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A fan blade airfoil and nose cone with leading edge fillet for debris deflection comprising:
   a fillet formed in the nose cone and inserted into a pocket formed in the fan blade, the filet configured to create a deflection air stream; the deflection air stream being configured to manipulate a fan inlet air flow such that any debris entrained in a fan inlet air flow has a trajectory line directed away from a core flow of a gas turbine engine and toward a bypass flow of the gas turbine engine.

2. The fan blade airfoil and nose cone with leading edge fillet for debris deflection according to claim 1, wherein the fillet is configured to create the deflection air stream which is configured to manipulate a boundary layer flow proximate the nose cone radially from a centerline axis of the nose cone.

3. The fan blade airfoil and nose cone with leading edge fillet for debris deflection according to claim 1, wherein the fillet is located upstream of the fan blade and arrayed circumferentially around the nose cone relative a centerline axis of the nose cone.

4. The fan blade airfoil and nose cone with leading edge fillet for debris deflection according to claim 1, wherein the fillet comprises a fillet curvature extending along a fillet length, the fillet curvature matching a curvature of the fan blade airfoil.

5. The fan blade airfoil and nose cone with leading edge fillet for debris deflection according to claim 1, wherein the fillet includes a fillet leading edge, the fillet leading edge includes a fillet canted surface; the fillet canted surface being slanted such that a height of the fillet leading edge proximate a suction side exceeds a height of the fillet leading edge proximate a pressure side along a length of the fillet leading edge.

6. The fan blade airfoil and nose cone with leading edge fillet for debris deflection according to claim 1, wherein a fillet height proximate a fillet leading tip is less than a fillet height proximate a fillet trailing tip.

7. The fan blade airfoil and nose cone with leading edge fillet for debris deflection according to claim 1 wherein, the pocket is proximate a blade platform and proximate a leading edge of the fan blade; the pocket extends along the leading edge radially away from a blade root portion; wherein the pocket is configured to receive the fillet.

8. A gas turbine engine having fan blade and nose cone with leading edge fillet for debris deflection comprising:
a fan section including a fan blade upstream from a bypass duct and a core separated by a splitter;
a fillet formed in the nose cone and inserted into a pocket formed in the fan blade; the filet comprising a fillet body including a base portion adjacent a fillet leading edge and a fillet trailing edge opposite the fillet leading edge; the fillet body including a fillet leading tip proximate an intersection of the fillet leading edge and the fillet base portion; the fillet body including a fillet trailing tip proximate an intersection of the fillet leading edge and the fillet trailing edge;
the pocket being proximate a blade platform and proximate a leading edge of the fan blade; the pocket extends along the leading edge radially away from a blade root portion; wherein the pocket is configured to receive the fillet.

9. The gas turbine engine having fan blade and nose cone with leading edge fillet for debris deflection according to claim 8, wherein the fillet comprises a fillet curvature extending along a fillet length, the fillet curvature matching a curvature along an airfoil of the fan blade.

10. The gas turbine engine having fan blade and nose cone with leading edge fillet for debris deflection according to claim 8, wherein the fillet is shaped to accelerate a deflection air stream to prevent formation of flow vortices in the deflection air stream and a fan inlet airflow.

11. The gas turbine engine having fan blade and nose cone with leading edge fillet for debris deflection according to claim 8, wherein the fillet leading edge includes a fillet canted surface; the fillet canted surface being slanted such that a height of the fillet leading edge proximate a suction side exceeds a height of the fillet leading edge proximate a pressure side along a length of the fillet leading edge.

12. The gas turbine engine having fan blade and nose cone with leading edge fillet for debris deflection according to claim 8, wherein the fillet body comprises a fillet thickness dimension extending between a fillet suction side and a fillet pressure side; the fillet thickness dimension varying from the fillet leading tip to the fillet trailing tip.

13. The gas turbine engine having fan blade and nose cone with leading edge fillet for debris deflection according to claim 8, wherein the fillet body is shaped as a turning vane and configured to prevent the formation of flow vortices in a deflection air stream and a fan inlet airflow.

14. A process for forming fan blade and nose cone with leading edge fillet for debris deflection comprising:
forming a fan section including a fan blade upstream from a bypass duct and a core separated by a splitter;
forming a fillet in the nose cone and inserting the fillet into a pocket formed in the fan blade; the filet comprising a fillet body including a base portion adjacent a fillet leading edge and a fillet trailing edge opposite the fillet leading edge; the fillet body including a fillet leading tip proximate an intersection of the fillet leading edge and the fillet base portion; the fillet body including a fillet trailing tip proximate an intersection of the fillet leading edge and the fillet trailing edge;
forming the pocket proximate a blade platform and proximate a leading edge of the fan blade; extending the pocket along the leading edge radially away from a blade root portion; and
configuring the pocket to receive the fillet.

15. The process of claim 14, further comprising:
forming a fillet curvature extending along a fillet length, the fillet curvature matching a curvature along an airfoil of the fan blade.

16. The process of claim 14, further comprising:
shaping the fillet to accelerate a deflection air stream to prevent formation of flow vortices in the deflection air stream and a fan inlet airflow.

17. The process of claim 14, further comprising:
forming the fillet leading edge including a fillet canted surface; the fillet canted surface being slanted such that a height of the fillet leading edge proximate a suction side exceeds a height of the fillet leading edge proximate a pressure side along a length of the fillet leading edge.

18. The process of claim 14, further comprising:
forming the fillet body comprising a fillet thickness dimension extending between a fillet suction side and a fillet pressure side; and
varying the fillet thickness dimension from the fillet leading tip to the fillet trailing tip.

19. The process of claim 14, further comprising:
configuring the fillet to create a deflection air stream to manipulate a boundary layer flow proximate the nose cone radially from the centerline axis of the nose cone.

20. The process of claim 14, further comprising:
configuring the fillet to create a deflection air stream;
configuring the deflection air stream to manipulate a fan inlet air flow such that any debris entrained in the fan inlet air flow has a trajectory line directed away from a core flow of a gas turbine engine and toward a bypass flow of the gas turbine engine.

* * * * *